United States Patent [19]

Reicks

[11] Patent Number: 5,759,127
[45] Date of Patent: Jun. 2, 1998

[54] METHOD FOR CONSTRUCTING A PULLEY FOR CONVEYOR BELTS

[75] Inventor: Allen V. Reicks, Pella, Iowa

[73] Assignee: Precision, Inc., Pella, Iowa

[21] Appl. No.: 690,502

[22] Filed: Jul. 31, 1996

[51] Int. Cl.$^6$ .................... F16H 55/36; F16H 7/20; B65G 39/10
[52] U.S. Cl. .................... 474/197; 474/166; 474/903; 198/842; 29/892.1
[58] Field of Search ................... 474/166, 197, 474/903; 198/835, 842; 29/892.1

[56] References Cited

U.S. PATENT DOCUMENTS

| | | | |
|---|---|---|---|
| 501,228 | 7/1893 | Jantz | 474/197 |
| 1,500,579 | 7/1924 | Eager | 474/903 |
| 1,648,626 | 11/1927 | Smith | 474/197 |
| 1,984,115 | 12/1934 | Cooper. | |
| 2,221,432 | 11/1940 | Peck | 474/197 |
| 2,925,293 | 2/1960 | Voss et al. | 474/903 |
| 3,023,699 | 3/1962 | MacArthur. | |
| 3,772,930 | 11/1973 | Lamport et al. | 474/903 |
| 4,144,022 | 3/1979 | Fusco. | |
| 4,563,106 | 1/1986 | Stuwe. | |
| 5,406,706 | 4/1995 | Nagai. | |

FOREIGN PATENT DOCUMENTS

| | | | |
|---|---|---|---|
| 453671 | 12/1949 | Italy | 474/166 |
| 132945 | 10/1919 | United Kingdom | 474/197 |

OTHER PUBLICATIONS

Precision; Weld and General Note Detail, shop drawing dated Apr. 2, 1992.
Precision; Weld and General Note Detail, shop drawing dated Apr. 2, 1993.
Precision, Inc.; shop drawing dated Jul. 20, 1995.
Precision, Inc.; reference data sheet (no date); entitled: Precision Conveyor Pulleys Equipped with XT Hubs and Bushings.

*Primary Examiner*—Tamara L. Graysay
*Assistant Examiner*—Gary S. Hartmann
*Attorney, Agent, or Firm*—Henderson & Sturm

[57] ABSTRACT

A method of constructing a pulley comprising a shaft, annular members and a rim, wherein the shaft has an integral tapered surface of a uniform slope near each end. The annular members have an interior periphery of a slightly larger diameter than the outside diameter of the shaft. The interior periphery of the annular members also includes a tapered surface with substantially the same slope as the outside diameter of the shaft at its tapered surfaces. In constructing the pulley, the shaft is inserted through the rim. The annular members are then placed over the ends of the shaft and displaced axially toward the tapered surfaces of the shaft until the tapered surface of the annular members are mateably engaged over the tapered surfaces of the shaft. A compressive interference connection is thereby created between the tapered surfaces. A continuous weld is placed all around the outside face of the annular member where the annular member intersects the shaft. A continuous weld is also placed all around the outside face of the annular member where the annular member intersects the interior periphery of the rim.

11 Claims, 3 Drawing Sheets

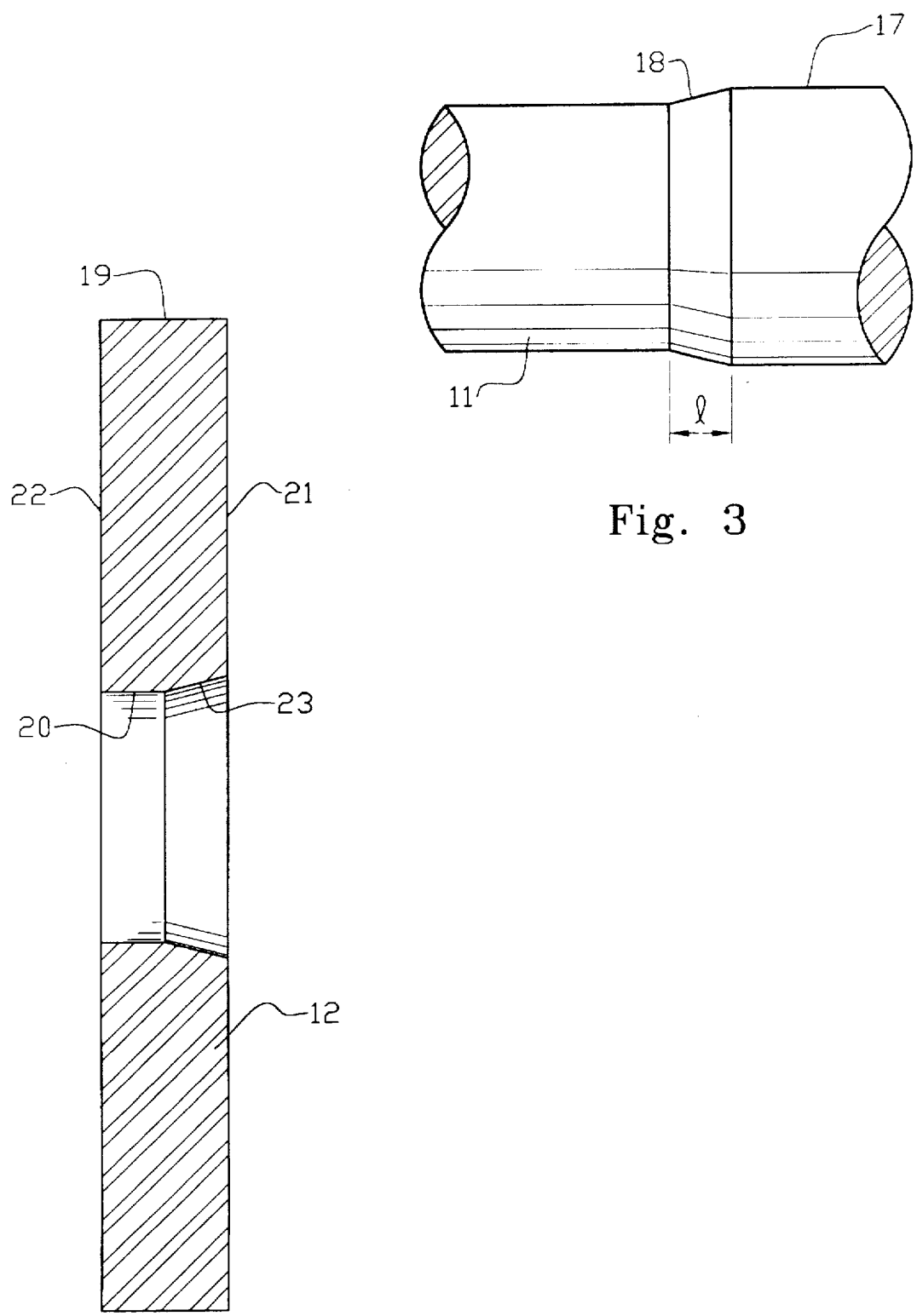

5,759,127

1

METHOD FOR CONSTRUCTING A PULLEY FOR CONVEYOR BELTS

TECHNICAL FIELD

The present invention relates generally to a method for connecting annular elements substantially transverse to the longitudinal axis of a shaft and specifically to a method for constructing a pulley.

BACKGROUND ART

The prior art includes numerous methods of connecting annular members substantially transverse to the longitudinal axis of a shaft. These connection methods include welding each side of the annular member to the shaft, bolting the member to the shaft by use of a threaded connection and hub, or using a "clamping ring" element to create a "friction-transmitting shaft/flange connection." On assemblies where access to the inside face of the annular member is limited, it is often not possible to weld both sides of the annular member to the shaft. On assemblies that use a threaded connection or on assemblies that use a clamping ring, a third element is required to complete the connection of the annular member to the shaft. The necessity of a third element increases the manufacturing costs of the assembly by adding more parts required for material, by increasing stocking costs, and by increasing labor costs.

DISCLOSURE OF THE INVENTION

The pulley of the present invention, includes a shaft, annular members, and a rim. The shaft includes a tapered surface along the longitudinal axis of the shaft near each end. The tapered surface is uniform in slope around the exterior periphery of the shaft. The interior periphery of each annular member is slightly larger in diameter than the outside diameter of the shaft and includes a tapered surface with substantially the same slope as the tapered surface of the shaft. In constructing the idler pulley, the shaft is inserted through the rim. The annular members are then placed over the ends of the shaft and displaced axially toward the tapered surfaces of the shaft until the tapered surface of the annular members are mateably engaged over the tapered surfaces of the shaft. A compressive interference connection is thereby created between the tapered surfaces. A continuous weld is placed all around the outside face of the annular member where the annular member intersects the shaft. A continuous weld is also placed all around the outside face of the annular member where the annular member intersects the interior periphery of the rim, thereby creating a sealed pulley.

Therefore, it is an object of the present invention to efficiently connect an annular member substantially transverse to the longitudinal axis of a shaft where the inside face of the annular member is not accessible for welding.

It is another object of the present invention to decrease the manufacturing costs of connecting annular members substantially transverse to the longitudinal axis of a shaft by eliminating the need for a third element previously required in the prior art.

A further object of the present invention is to create a shaft-annular member connection that better transfers the bending moments from the shaft to the annular members and subsequently to the rim.

Other objects, advantages, and novel features of the present invention will become apparent from the following detailed description of the invention when considered in conjunction with the accompanying drawings.

2

BRIEF DESCRIPTION OF THE DRAWINGS

FIG. 3 is a detailed view of the tapered surface at one end of the shaft;

FIG. 4 is a detailed sectional view of an annular member; and

BEST MODE FOR CARRYING OUT THE INVENTION

Figure 1:
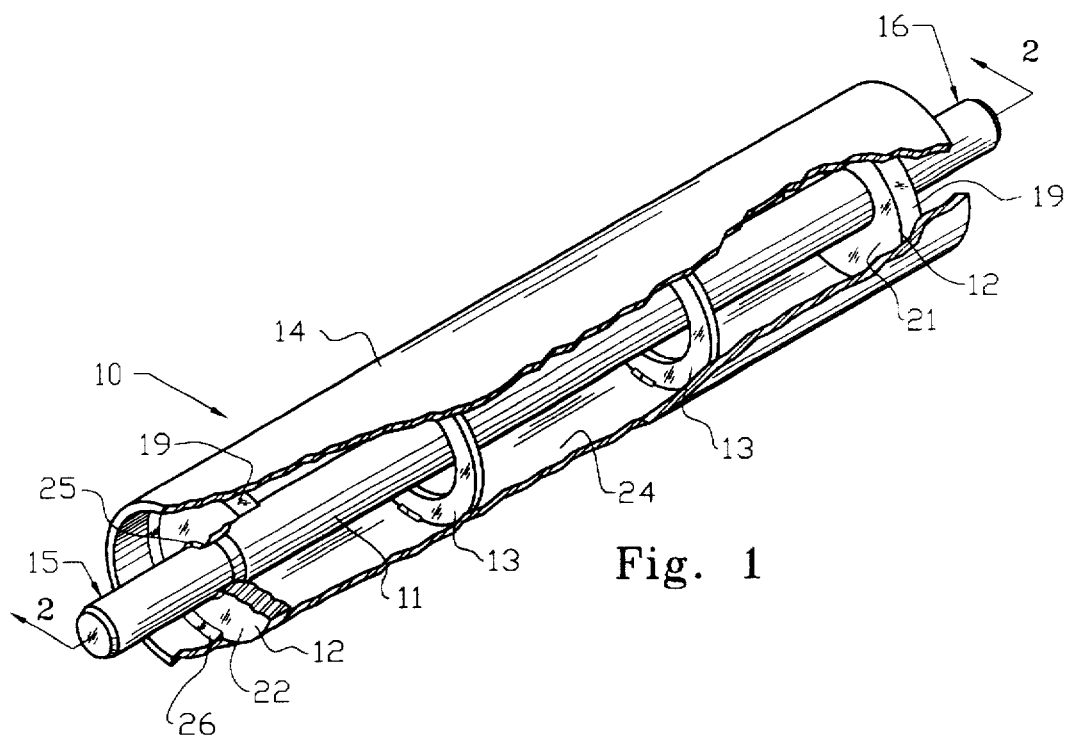
FIG. 1 is a perspective view of an idler pulley with the exterior rim cut away to show the annular members connected to the shaft.

To assist in a better understanding of the invention, a description of different forms and embodiments of the invention will now be described in detail. Reference will be made to the accompanying drawings. Reference numbers and letters will be used in the drawings to indicate specific parts and location on the drawings. The same reference numerals and letters will be used throughout the drawings unless otherwise indicated. It is to be understood that the scope of the invention is not limited to the specific embodiments discussed herein.

Figure 2:
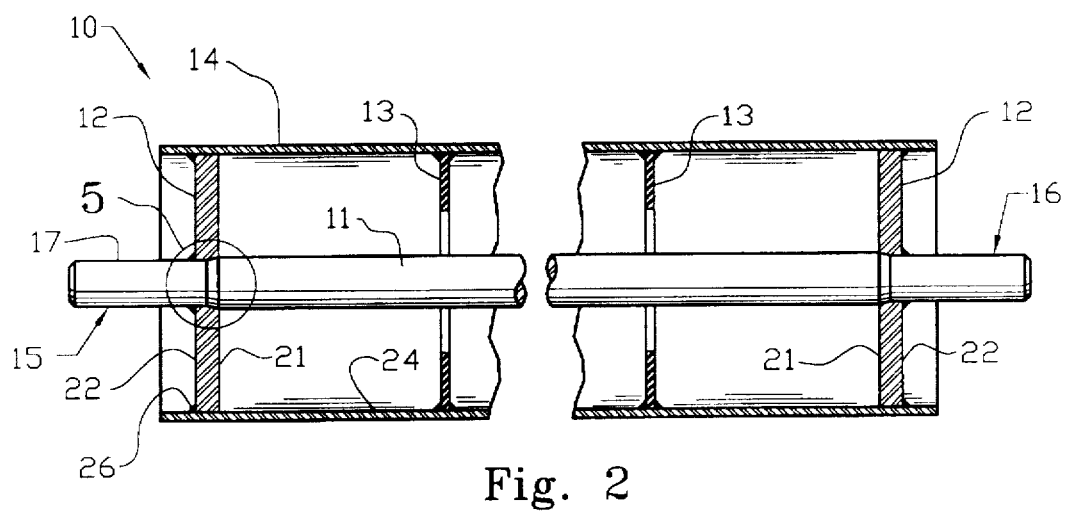
FIG. 2 is a section view of the idler pulley along line 2—2 of FIG. 1.

In FIGS. 1 and 2, a pulley (10) built in accordance with the present invention is shown. The pulley (10) includes a shaft (11), annular members (12), and a rim (14). Interior stiffening rings (13) may be welded to the interior periphery (24) of the rim (14) to decrease deflection of the rim surface. Referring now to FIGS. 1 through 3, in the preferred embodiment, the shaft (1) is cylindrical, having a first end (15), a second end (16), and an exterior periphery (17). Near each end (15 and 16) of the shaft (11), there is a tapered surface (18), over a length "l" with a uniform slope around the exterior periphery (17). The slope (rise/run) of the tapered surface in the preferred embodiment is 1/32. Referring now to FIGS. 1 and 4, each annular member (12), has an exterior periphery (19), an interior periphery (20), an inside face (21) and an outside face (22). The interior periphery (20) of each annular member (12) is slightly larger in diameter than the outside diameter of the shaft ends (15 and 16) and includes a tapered surface (23) with substantially the same slope as the tapered surface (18) of the shaft (11).

In constructing the idler pulley of the present invention, the shaft (1) is inserted through the rim (14). Each annular member (12) is placed over the ends (15 and 16) of the shaft (11). Each annular member (12) is displaced axially toward the tapered surface (18) near each end (15 and 16) of the shaft (11) until the tapered surface (23) of each annular member (12) is mateably engaged over the tapered surfaces (18) of the shaft (11). The tapered surfaces (18 and 23) act to center the annular member (12) over the shaft (11) as the annular members (12) are axially displaced. The annular members (12) continue to be axially displaced until a compressive interference connection is created between the tapered surfaces (18 and 23). A continuous weld (25) is then placed around the outside face (22) of each annular member (12) at the intersection of the interior periphery (20) of the annular member (12) and the exterior periphery (17) of the shaft (11). Also, a continuous weld (26) is placed around the outside face (22) of each annular member (12) at the intersection of the exterior periphery (19) of the annular member (12) and the interior periphery (24) of the rim (14).

The compressive interference connection at the inside face (21) of the annular member (12) and the weld (25) at the outside face (22) of the annular member (12) create two separate connection areas for transferring the shaft bending moments to the annular member. Weld (26) subsequently transfers the bending moment in the annular member (12) to the rim (14).

Figure 5A:
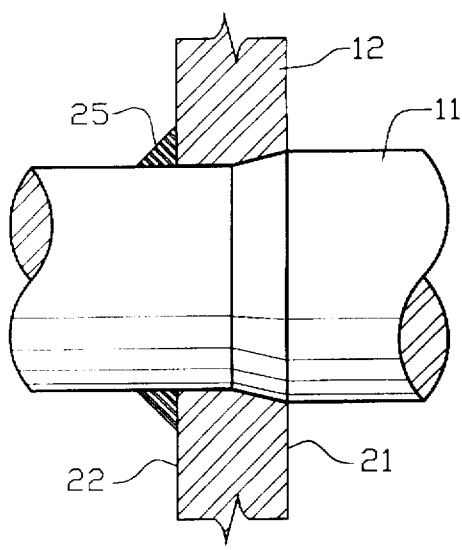
FIG. 5A, 5B and 5C show alternate embodiments of the annular member and shaft connection.
Figure 5B:
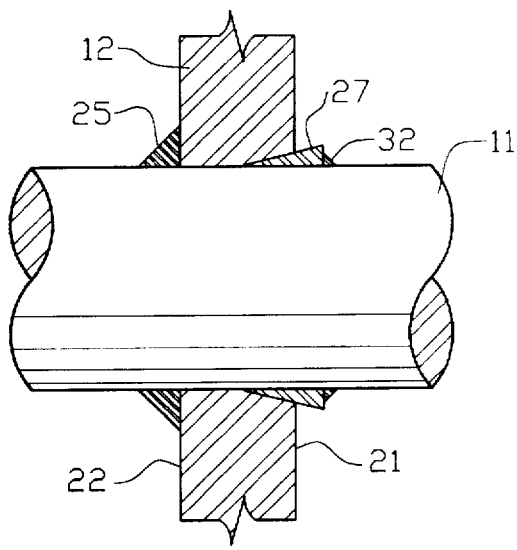
Figure 5C:
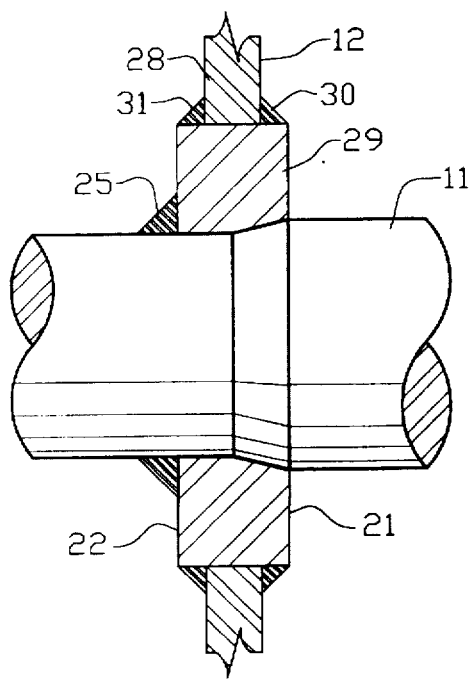

FIGS. 5A, 5B and 5C represent alternate embodiments of the annular member-to-shaft connection. FIG. 5A, is a detailed view of the annular member-to-shaft connection shown in FIG. 2 and discussed above. The weld (25) connecting the outside face (22) of the annular member (12) to the shaft (11) is shown in section. The weld (25) may be a fillet weld, groove weld, or a fillet and groove weld combination.

FIG. 5B shows an alternate embodiment of the present invention. Instead of a tapered shaft (11) as shown in FIG. 5A, a shaft (11) of a constant diameter is used along with a tapered ring (27). The tapered ring (27) is attached to the shaft (11) by a weld (32) before the shaft is inserted through the rim (14). The method of constructing the idler pulley (10) is performed substantially the same as previously described. Each annular member (12) is placed over the ends (15 and 16) of the shaft (11). Each annular element (12) is displaced axially toward the tapered ring (27) resulting in a compressive interference connection between the tapered surface (23) of annular member (12) and the tapered ring (27) attached to the shaft (11). A continuous weld (25) is then placed around the outside face (22) of each annular member (12) at the intersection of the interior periphery (20) of the annular member (12) and the exterior periphery (17) of the shaft (11). Also, a continuous weld (26) is placed around the outside face (22) of each annular member (12) at the intersection of the exterior periphery (19) of the annular member (12) and the interior periphery (24) of the rim (14).

In FIG. 5C, another embodiment of the annular member to shaft connection is shown. The same shaft (11) as described in the preferred embodiment and as shown in FIG. 5A is used. The annular member (12) includes an outer ring (28) and a thicker inner hub (29). The outer ring (28) and the inner hub (29) are continuously welded together at the inside face (21) by weld (30) and at the outside face (22) by weld (31) to form a single annular member (12). The interior periphery of the hub (29) has a tapered surface with the same slope and inside diameter as the annular member described in FIG. 5A. The outer ring (28) also has the same exterior periphery (19) as described previously and shown in FIG. 4. The method of constructing the idler pulley (10) is performed substantially the same as previously described. Each annular member (12) is placed over the ends (15 and 16) of the shaft (11). Each annular element (12) is displaced axially toward the tapered surface (18) of shaft (11) resulting in a compressive interference connection between the tapered surface (23) of annular member (12) and the tapered surface (18) of the shaft (11). A continuous weld (25) is then placed around the outside face (22) of each annular member (12) at the intersection of the interior periphery (20) of the annular member (12) and the exterior periphery (17) of the shaft (11). Also, a continuous weld (26) is placed around the outside face (22) of each annular member (12) at the intersection of the exterior periphery (19) of the annular member (12) and the interior periphery (24) of the rim (14).

Obviously many modifications and variations of the present invention are possible in light of the above teachings. It is therefore to be understood that, within the scope of the appended claims, the invention may be practiced otherwise than as specifically described.

I claim:

1. A method of constructing a pulley of a type including a shaft having a first end and a second end and an exterior periphery, said exterior periphery including a descending tapered surface integral with said shaft near said first end and said second end of said shaft; a rim having an interior periphery disposed around the longitudinal axis of said shaft; a first and second annular member each having an interior periphery, an exterior periphery, an inside face and an outside face, said interior periphery of said annular members having an ascending tapered surface away from said outside face toward said inside face; said method comprising:

inserting said shaft longitudinally through the interior periphery of said rim;

placing said first annular member over said first end of said shaft, said ascending tapered surface at interior periphery of said first annular member facing said descending tapered surface integral with said first end of said shaft;

displacing said first annular member axially toward the center of said shaft until said ascending tapered surface at interior periphery of said annular member engages said descending tapered surface integral with said first end of said shaft, thereby creating a compressive interference connection between said tapered surfaces;

placing said second annular member over said second end of said shaft, said ascending tapered surface at interior periphery of said second annular member facing said descending tapered surface integral with said second end of said shaft;

displacing said second annular member axially toward the center of said shaft until said ascending tapered surface at interior periphery of said annular member engages said descending tapered surface integral with said second end of said shaft, thereby creating a compressive interference connection between said tapered surfaces;

connecting said outside face of each said first and second annular members to said exterior periphery of said shaft where said respective outside face intersects said shaft; and connecting said outside face of said annular members to said interior periphery of said rim where said outside face intersects said rim.

2. The method of claim 1 wherein said outside face of said annular members is connected to said exterior periphery of said shaft by welding.

3. The method of claim 1 wherein said outside face of said annular members is connected to said interior periphery of said rim by welding.

4. A pulley comprising:

a shaft, said shaft having a first end and a second end and an exterior periphery, said exterior periphery including a descending tapered surface integral with said shaft near said first end and said second end of said shaft;

a rim, said rim having an interior periphery disposed around the longitudinal axis of said shaft;

annular members, said annular members having an interior periphery, an exterior periphery, an inside face and an outside face, said interior periphery of said annular members having an ascending tapered surface away from said outside face toward said inside face, said ascending tapered surface of said annular member being mateably engaged over said descending tapered surface integral with said first and said second ends of said shaft; said outside face of said annular members being connected to said exterior periphery of said shaft; and said exterior periphery of said annular members being connected to said interior periphery of said rim.

5. The pulley of claim 4 wherein said outside face of said annular members is connected to said exterior periphery of said shaft by welding.

6. The method of claim 4 wherein said outside face of said annular members is connected to said interior periphery of said rim by welding.

7. The pulley of claim 4 wherein the mateable engagement of said tapered surfaces of said shaft and said annular members is a compressive interference connection capable of transferring shaft bending moments to the annular member.

8. A subassembly comprising;
- a shaft, said shaft having a first end and a second end and an exterior periphery; said exterior periphery including a descending tapered surface integral with said shaft near said first end of said shaft;
- a cylindrical member, said cylindrical member having an interior periphery disposed around the longitudinal axis of said shaft;
- an annular member, said annular member having an interior periphery, an exterior periphery, an inside face and an outside face; said interior periphery of said annular member having an ascending tapered surface away from said outside face toward said inside face, said ascending tapered surface of said annular member being mateably engaged over said descending tapered surface integral with said first end of said shaft; said outside face of said annular member being connected to said exterior periphery of said shaft; and said exterior periphery of said annular member being connected to said interior periphery of said cylindrical member.

9. The subassembly of claim 8 wherein said outside face of said annular member is connected to said exterior periphery of said shaft by welding.

10. The subassembly of claim 8 wherein said outside face of said annular member is connected to said interior periphery of said cylindrical member by welding.

11. The subassembly of claim 8 wherein the mateable engagement of said tapered surfaces of said shaft and said annular members is a compressive interference connection capable of transferring shaft bending moments to the annular member.

* * * * *